United States Patent [19]
Ririe et al.

[11] 3,777,979
[45] Dec. 11, 1973

[54] MOBILE IRRIGATION SYSTEM AND PIPE COUPLING

[75] Inventors: Max H. Ririe, Gering; Murray C. Roland; Rich Olson, both of Scottsbluff, all of Nebr.

[73] Assignee: Lockwood Corporation, Gering, Nebr.

[22] Filed: Mar. 24, 1972

[21] Appl. No.: 237,796

[52] U.S. Cl.................. 239/177, 137/344, 239/212
[51] Int. Cl............................................... B05b 3/00
[58] Field of Search.......................... 239/177, 212; 137/344; 285/283

[56] References Cited
UNITED STATES PATENTS

| | | |
|---|---|---|
| 3,394,729 | 7/1968 | Bower et al.................... 239/212 X |
| 3,558,258 | 1/1971 | Johnson, Jr......................... 239/177 |
| 3,680,787 | 8/1972 | Sherman......................... 239/212 X |

Primary Examiner—M. Henson Wood, Jr.
Assistant Examiner—Michael Y. Mar
Attorney—McDougall, Hersh & Scott

[57] ABSTRACT

A connection between pipe sections making up an elongate water distributing pipe for mobile irrigation apparatus to permit pivotal movement between interconnected pipe sections while maintaining a sealing relationship therebetween.

6 Claims, 8 Drawing Figures

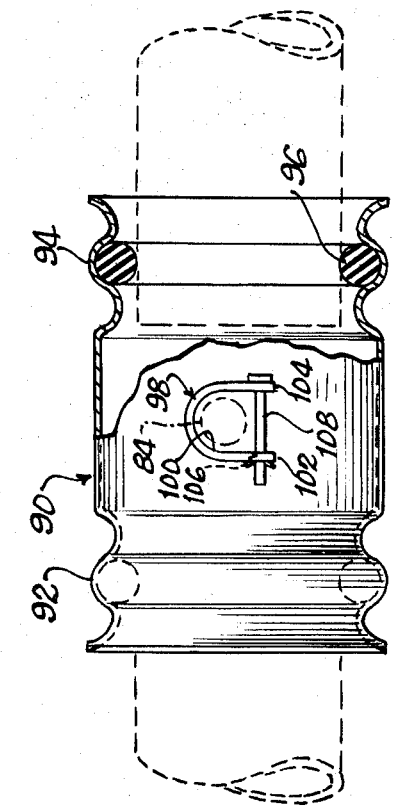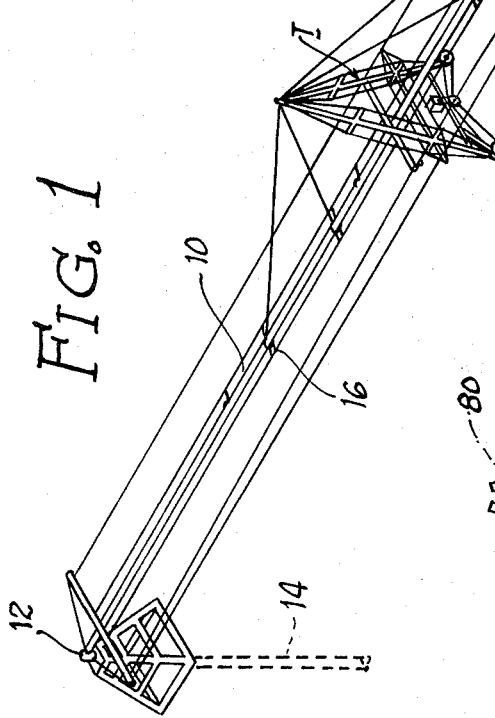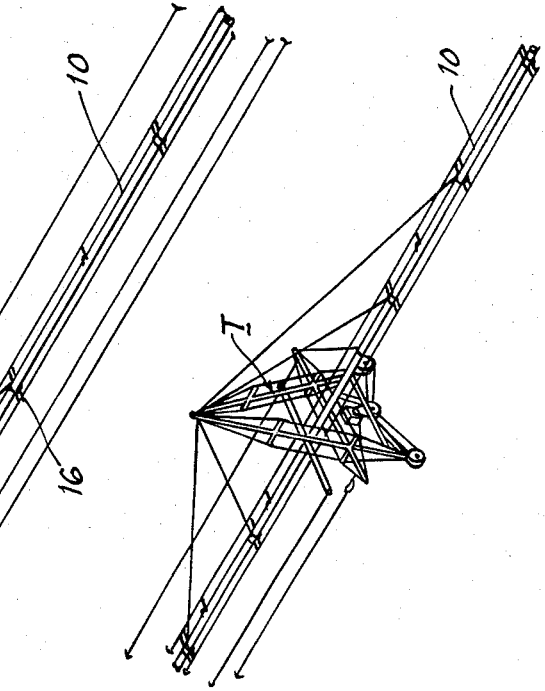

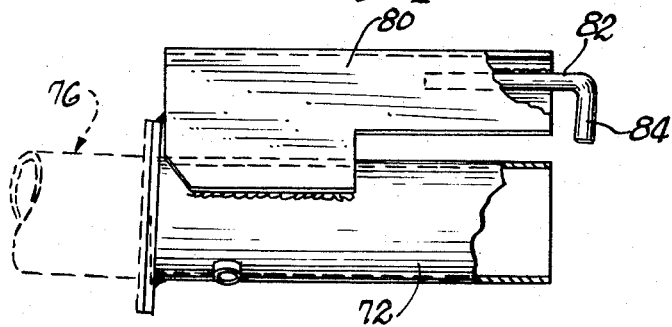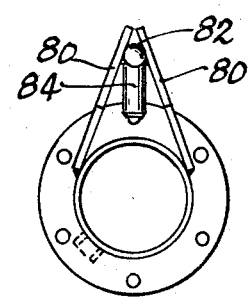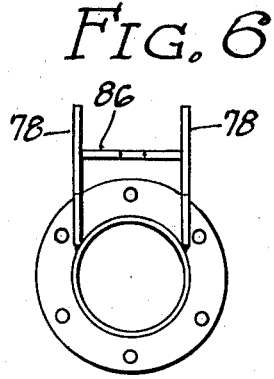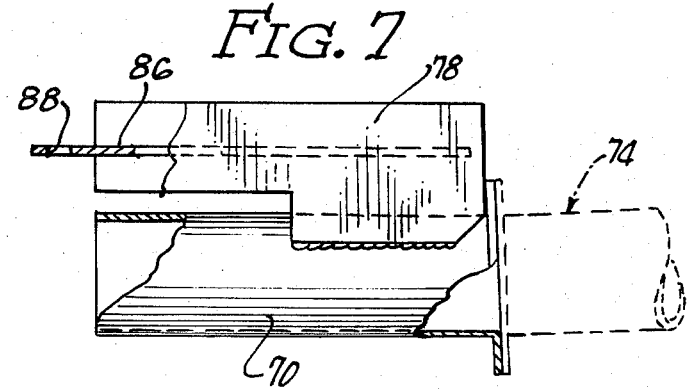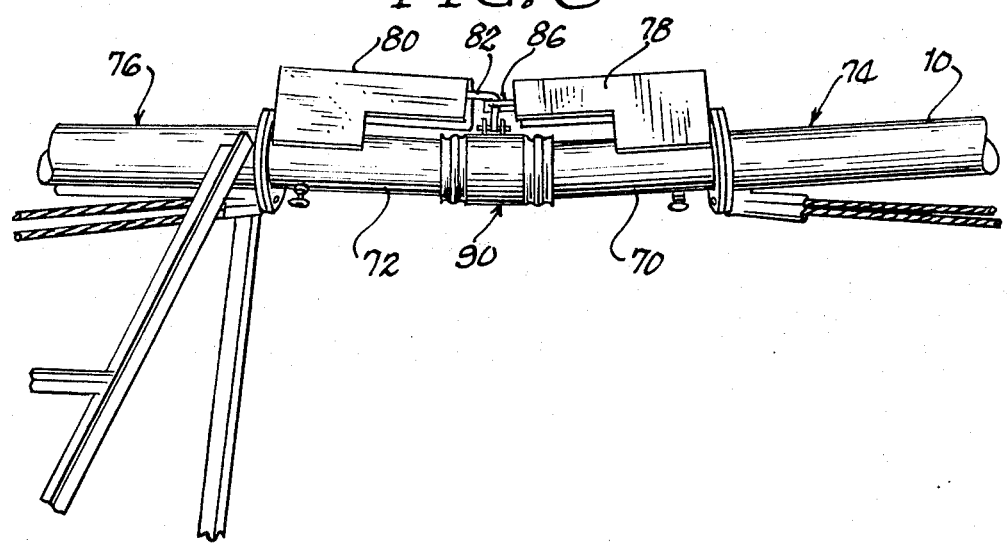

ns,779

MOBILE IRRIGATION SYSTEM AND PIPE COUPLING

This invention relates to a mobile irrigation apparatus in which use is made of an elongate water distributing pipe having a number of sprinkler outlets and in which the elongate pipe is supported at longitudinally spaced apart portions by mobile support towers that carry the pipe for traverse over the ground, and in which pipe sections are connected in sealing relationship in a manner to permit limited pivotal movement therebetween.

Self-propelled sprinkling systems for irrigation of large areas are now well known. In a typical system, use is made of a main distributor pipe which may be as much as one-half mile in length. The inner end portion of the pipe is connected to a source of water for the supply of water under pressure to sprinkling heads spaced along the length of the pipe for dispensing the water onto the crops in the field that is covered by the sprinkling system. The distributor pipe can be adapted to move across the field in a substantially straight line but it is usually connected for rotation about a central pivot where the pivotal end of the distributor pipe is connected to the water supply. The distributor pipe is supported on a plurality of self-propelled towers limited at spaced intervals along the length of the distributor pipe and which operate to carry the pipe across the field. Typical systems are illustrated in U.S. patents of Zyback, U.S. Pat. No. 2,604,359; Behlen, U.S. Pat. No. 2,726,895; Bower et al. U.S. Pat. No. 3,394,729; Curtis, U.S. Pat. No. 3,352,403, and Dowd, U.S. Pat. No. 3,342,417.

As a matter of practice, it is impractical to maintain perfect crosswise alignment between the towers on which the distributor pipe is supported. Usually, one tower, preferably the outermost tower, is adapted to be constantly driven at a predetermined pace and the intermediate towers located between the driven tower and the pivot are controlled to maintain a semblance of alignment between the driven tower and the pivot. Normally, the intermediate towers will lag a little behind or proceed ahead of the desired position of alignment and the independent drive for each tower will be operated in response to an alignment control to either catch up or to wait for alignment position with intermediate towers.

As a result, the distributor pipe is subjected constantly to bending movements, mostly in a horizontal plane along the axis of the distributor pipe, although the pipe may also be subjected to vertical bending movements due to travel of the towers over hilly terrain or ground which has not been leveled.

In addition, such main water distributor pipe may stretch for a total of one-half mile or more. Thus it is desirable to break up the length of pipe into a number of pipe sections and to accommodate the bending movements of the pipe at such connections by providing a sealed connection between sections with controlled pivotal movements therebetween.

To the present, use has been made of a coupling system into which the adjacent ends of the adjacent pipe sections are telescoped with sealing means between each of the ends and the coupling member to provide a flexible seal therebetween which enables relative angular movements between the pipe sections. The adjacent ends of the pipe are pivotally connected one to the other within the coupling member for centered control of relative pivotal movements between the pipe sections and the coupling member.

It has been found that such pivotal interconnection between pipe sections internally of the coupling member for centered control makes it difficult to gain access to the pivotal connection for assembly or for disassembly and the pivotal connection within the coupling member occupies space which reduces the fluid capacity of the pipe.

Thus it is an object of this invention to provide means for connection between pipe sections which enables pivotal movement in all directions while maintaining a sealed connection between pipe sections, in which the pivotal interconnection between pipe sections is external of the connection to provide easy access for assembly or disassembly, and for removal or replacement of sealing members and other parts, which includes means for centering the pivotal connection and which prevents inadvertent disengagement between the elements making up the sealed pivotal connection so as to insure the maintenance of the desired assembled relationship in use.

These and other objects and advantages of this invention will hereinafter appear and for purposes of illustration, but not of limitation, an embodiment of the invention is shown in the accompanying drawings, in which FIG. 1 is a perspective view of the irrigation system embodying the features of this invention;

FIG. 2 is a side elevational view of the coupling member;

FIG. 3 is an end elevational view of the coupling member of FIG. 2;

FIG. 4 is a side elevational view of the coupling hook member;

FIG. 5 is an end elevational view of the coupling hook member of FIG. 4;

FIG. 6 is an end elevational view of the coupling eye member;

FIG. 7 is a side elevational view of the coupling eye member of FIG. 6; and

FIG. 8 is a perspective view of the elements of FIGS. 2–7 assembled into a flexible connection.

The invention will be described with reference to an irrigation system which makes use of an elongate horizontally disposed water distributing pipe 10 which is provided with a swivel connection, at 12, at its inner end for pivotal attachment to the upper end of a feed pipe 14 which may extend downwardly to an underground source of water or well or which is otherwise supplied with water.

The distributor pipe is provided with a plurality of spray nozzles 16 at frequently spaced intervals along the length of the pipe to sprinkle water on the crop, as the distributor pipe moves over the ground. The distributor pipe is supplied with water under pressure, as by means of a water pump connected to the supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support. Instead, it can rest on the tower, as on a cradle rigidly secured to the support but, in accordance with the preferred practice of this invention, the distributor pipe is rigidly connected with the support tower as by means of straps or struts.

The mobile tower is not a critical element of the invention since mobile towers of various constructions generally employed in the trade can be used.

As previously pointed out, mobile irrigation systems of the type described make use of water distributing pipes which may stretch for over one-half mile from one end to the other. As a result, it is impractical to make the distributor pipe available in a single length. It is desirable to subdivide the distributor pipe into a plurality of separate sections and to provide means for interconnection of the separate sections in end to end relation, with a fluid seal between connections, to enable transmission of water under pressure throughout the length of the interconnected pipe sections.

In addition, since, as previously pointed out, the water distribution pipe is subjected to a number of bending moments by reason of the unevenness of the ground over which the supporting towers travel and by reason of the non-uniform movements of the towers whereby one lags beyind or goes ahead of adjacent towers, it is desirable to limit such bending moments to the interconnection between pipe sections whereby the length of pipe will be put under minimum stress and strain.

This invention is addressed to the means for interconnection between pipe sections making up the elongate water distributor pipe, wherein the pipe sections are interconnected in a manner which enables relative angular movement between pipe sections while maintaining a sealed relationship therebetween, in which the pipe sections are pivotally interconnected in a centered relationship such that the interconnection can be maintained notwithstanding the relative angular movements between pipe sections, and in which the centered interconnection between pipe sections is external of the pipe for ready access for engagement or disengagement of the connection for replacement or repair of parts.

Referring now to the drawings, the pipe sections are pivotally interconnected, preferably, though not necessarily, immediately adjacent a mobile tower T for maximizing the support of the pipe sections at their interconnection. For this purpose, the adjacent end portions 70 and 72 of the pipe sections 74 and 76 respectively to be pivotally interconnected are provided with brackets 78 and 80, fixed, as by welding to the top side of the pipe sections, and spaced a short distance from the ends thereof.

A hook member in the form of an elongate arm 82 having a downturned end 84 is secured to one of the brackets 80 with the arm extending horizontally in vertically spaced apart parallel relation with the distributor pipe 72 and with the arm 82 extending in the direction towards the end of the pipe and dimensioned to have a length to extend beyond the end of the pipe for a short distance, with the hook portion 84 extending downwardly for a distance slightly less than the distance between the arm and the adjacent peripheral surface of the pipe so as to terminate a short distance from the surface of the pipe.

An eye member, in the form of a horizontally disposed plate 86 having an eye opening 88, is secured, as by welding, to the bracket 78 with the plate 86 extending horizontally in parallel relation above the surface of the distributor pipe section 74 by an amount less than the spaced relationship between the arm 82 and the pipe but more than the distance between the end of the hook member 84 and the level of the pipe so that the hook member will extend through the eye 88 for pivotal interconnection when the pipe sections 76 and 74 are in alignment in their interconnected relation. For this purpose, the eye opening 88 is dimensioned to be larger in cross section than the hook end 84 of the arm to enable the hook member to extend downwardly therethrough. The arm 82 and the plate 86 are dimensioned to position the hook and eye in substantial vertically aligned relationship midway between the ends of the pipe sections 74 and 76, when in their interconnected relation, to define the pivotal point therebetween.

The adjacent end sections 72 and 70 of the pipe sections 74 and 76 are flexibly connected in sealing relationship to provide a continuous passage therebetween, by means of a coupling member 90 in the form of a cylindrical section having annular grooves 92 and 94 in the end portions thereof for receiving 0 rings 96 as sealing elements between the coupling member and the ends of the pipe sections extending therein in telescoping relation. The coupling member 90 is dimensioned to have a diameter slightly greater than the end sections 70 and 72 of the pipes to enable the coupling member to be telescoped over the pipe ends and it is dimensioned to have a length whereby the annular grooves which support the 0 rings are spaced one from the other by an amount greater than the ends of the pipe sections in their interconnected relationship so that the ends of the pipes will project into the coupling member for a distance beyond the 0 rings for flexible sealing engagement between the telescoped end portions of the pipe and the coupling member.

With reference to the pivotally interconnecting hook and eye members, the coupling members should be dimensioned to have a length greater than the distance between the hook and the adjacent end of the pipe plus the eye and the adjacent end of the other pipe so that the 0 ring containing portions will engage the pipe ends when the hook and eye members are in their pivotally interconnected relation.

To insure that the coupling member will remain centered between the interconnected pipe sections, the top side of the coupling member is provided at its center with a locating bracket 98 which extends upwardly from the top side of the coupling member for a distance greater than the distance between the end of the hook member 84 and the top side of the pipe or coupling member so that the end of the hook will extend into the pocket 100 of the bracket when in the assembled relation. The bracket shown is in the form of a U-shaped member having parallel legs 102 and 104 with the ends of the legs having crosswise aligned openings 106 for the insertion of a latching pin 108 thereby to close the opening and confine the hook 84 in a manner to prevent inadvertent displacement from the locating bracket.

Thus the bracket and hook are aligned with the pivot point between the interconnected pipe sections and serve to latch the coupling member in its centered relation between the end sections 70 and 72 of the interconnected pipes to prevent relative endwise movement or inadvertent disengagement between the coupling member and any one of the interconnected pipe sections.

Thus the interconnected hook 84 and eye 88 represent the pivot point about which the adjacent pipe sections can turn relative to one another in use while retaining the pipe sections in their interconnected relationship with the coupling member.

Because of the centered pivotal connection between pipe sections externally of the pipe, it is possible to effect the connection or disconnection in a simple and efficient manner, merely by removal of the pin 108 to enable displacement of the hook 84 from the bracket 98 after which a pipe section can be withdrawn from the coupling and the hook and eye members disengaged for separation of the elements for repair or replacement of parts or merely for separation of the pipe lengths.

It will be understood that changes may be made in the details of construction, arrangement and operation without departing from the spirit of the invention, especially as defined in the following claims.

We claim:

1. In a mobile irrigation apparatus having an elongate horizontally disposed water distributor pipe, an inlet at one end for introduction of water under pressure, a plurality of discharge nozzles spaced along the distributor pipe for applying water as the distributor pipe is carried over the land, and a plurality of mobile supports in spaced apart relation along the length of the distributor pipe for support of the pipe at longitudinally spaced apart portions, the improvement wherein the elongate distributor pipe is subdivided into a plurality of shorter pipe sections with means for interconnecting the pipe sections in end to end relation for a continuous passage therebetween and means for enabling a pivotal movement between the interconnected pipe sections while maintaining a sealed relationship therebetween comprising a coupling member dimensioned to have a length greater than the distance between the ends of adjacent pipe sections and a passage therethrough which is greater than the outer wall to all dimension of the pipe sections to enable the ends of the adjacent pipe sections to be telescoped therein and resilient sealing means between the telescoped end portions of the pipe sections and the coupling member, means for releasably connecting the adjacent pipe sections one to another and the coupling member comprising a hook member fixed to one of the pipe sections spaced outwardly from the outer periphery of the pipe and extending beyond the end of the pipe with a hook end portion turned inwardly in the direction towards the pipe, and an eye member similarly fixed to the other pipe section having an eye opening in a portion extending beyond the end of the pipe in position for insertion of the book end therethrough, said hook and eye members being substantially radially aligned with about the mid portion of the coupling.

2. A mobile irrigation apparatus as claimed in claim 1 in which the portion of the hook member spaced outwardly from the pipe is parallel with the pipe and spaced therefrom by an amount greater than the difference between the radius of the pipe section and the radius of the coupling member.

3. A mobile irrigation apparatus as claimed in claim 2 in which the portion of the hook member is spaced from the periphery of the pipe by an amount greater than the eye member connected to the other pipe section to enable the hook portion to be inserted through the eye portion.

4. In a mobile irrigation apparatus having an elongate horizontally disposed water distributor pipe, an inlet at one end for introduction of water under pressure, a plurality of discharge nozzles spaced along the distributor pipe for applying water as the distributor pipe is carried over the land, and a plurality of mobile supports in spaced apart relation along the length of the distributor pipe for support of the pipe at longitudinally spaced apart portions, the improvement wherein the elongate distributor pipe is subdivided into a plurality of shorter pipe sections with means for interconnecting the pipe sections in end to end relation for a continuous passage therebetween and means for enabling a pivotal movement between the interconnected pipe sections while maintaining a sealed relationship therebetween comprising a coupling member dimensioned to have a length greater than the distance between the ends of adjacent pipe sections and a passage therethrough which is greater than the outer wall to wall dimension of the pipe sections to enable the ends of the adjacent pipe sections to be telescoped therein and resilient sealing means between the telescoped end portions of the pipe sections and the coupling member, means for releasably connecting the adjacent pipe sections one to another and the coupling member comprising a hook member fixed to one of the pipe sections spaced outwardly from the outer periphery of the pipe and extending beyond the end of the pipe with a hook end portion turned inwardly in the direction towards the pipe, and an eye member similarly fixed to the other pipe with a hook end portion turned inwardly in the direction towards the pipe, and an eye me mber similarly fixed to the other pipe section having an eye opening in a portion extending beyond the end of the pipe in position for insertion of the hook end therethrough, an enclosure extending outwardly from an intermediate portion of the periphery of the coupling member and in which the inturned hook on the end of the hook member terminates at a level beyond the enclosure but before the outer wall of the coupling member whereby the hook will be entrapped within the enclosure for retaining the elements in their centered relation when assembled.

5. An irrigation apparatus as claimed in claim 4 in which the hook terminates at a distance spaced from the periphery of the pipe section of an amount which is greater than the difference between the radius of the pipe and the radius of the coupling member but less than such difference plus the height of the enclosure.

6. An irrigation apparatus as claimed in claim 4 in which the enclosure is in the form of a U-shaped member having openings in the opposite legs of the U-shaped portions and a locking pin insertable through said openings to close the open end of the U-shaped portion

* * * * *